Figure 1:
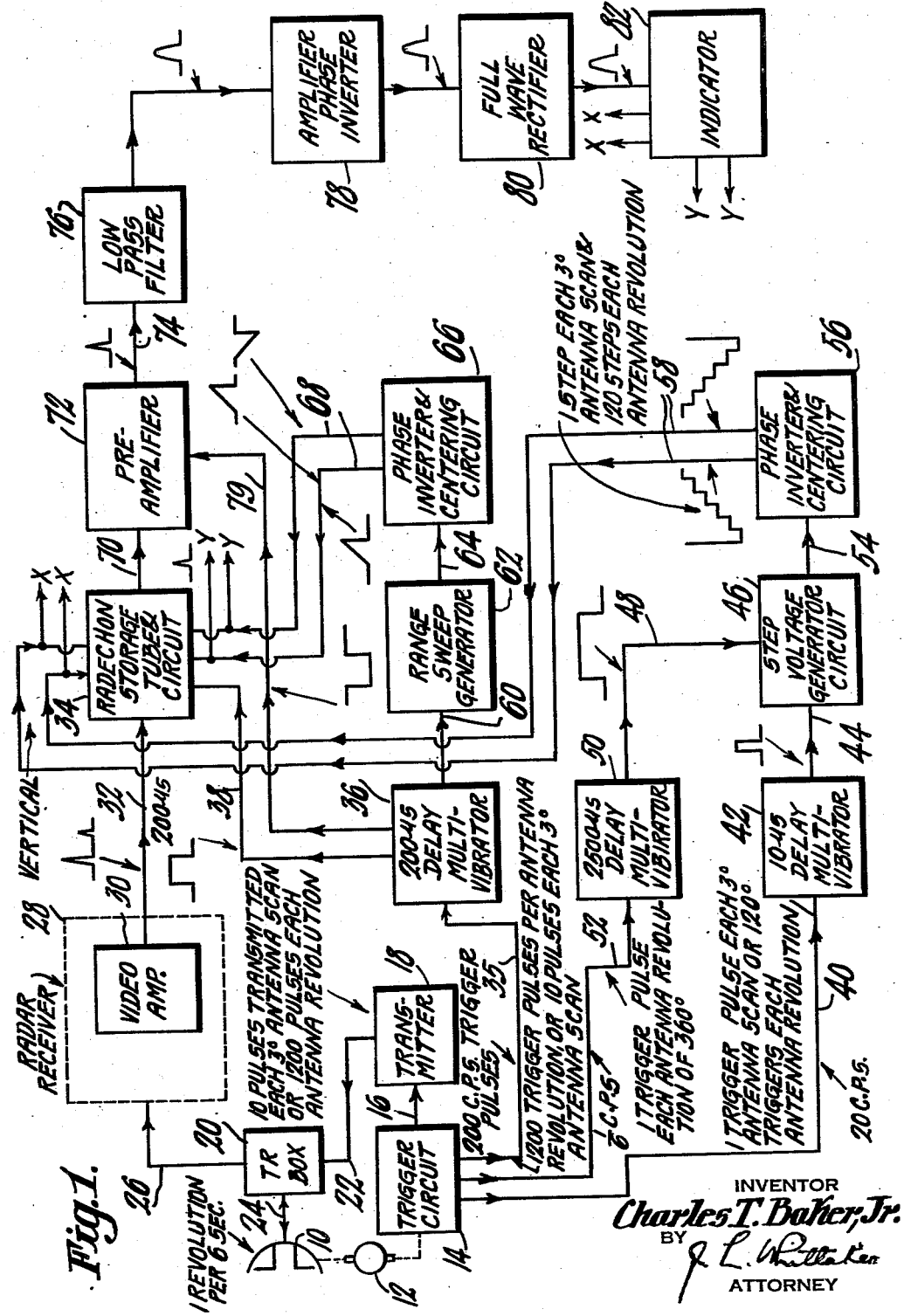

Fig. 2.

United States Patent Office 2,811,715
Patented Oct. 29, 1957

2,811,715

MOVING TARGET INDICATOR RADAR

Charles T. Baker, Jr., Camden, N. J., assignor, by mesne assignments, to the United States of America as represented by the Secretary of the Army Application October 2, 1950, Serial No. 188,015

7 Claims. (Cl. 343—7.7)

The present invention is related to radio echo detection and ranging (radar) systems and more particularly to MTI systems, that is, those which are used for moving target indications (MTI).

MTI systems have been known in which a pulse of high frequency energy is transmitted from a radar antenna and the echoes received are stored and compared with the echoes received on the next succeeding transmission. Earlier MTI systems relied largely upon recognition of a doppler frequency or a phase shift introduced into the reflected energy by a moving target. Other MTI radar systems have used storage devices in which an echo is stored and compared with a later received echo. These systems in general suffer from fluctuations in the received signals which are not due to motion of the target itself. The undesired fluctuations termed "clutter" are due to the scanning motion of the antenna and other effects. This problem is discussed specifically for example, at pages 642, to 649 of Radar System Engineering, edited by Ridenour, volume 1 of the Radiation Laboratory Series. The difficulty of moving target signal recognition is present in practically all MTI systems.

It is an object of the present invention to improve MTI radar.

It is a further object of the invention to overcome the difficulty in recognition of moving targets in an MTI radar system which results from clutter generally, and from antenna scanning particularly.

A further object of the invention is to reduce the background clutter in an MTI scanning system which might interfere with moving target signal recognition.

Another object of the invention is to improve and increase the cancellation ratio in MTI systems, that is, the ratio of input signals to output signals from fixed targets.

At least one of the techniques heretofore used for moving target recognition systems involves a storage device which may be a storage tube. The echoes received from each transmitted pulse are stored on one element of the storage device. Thus in the case the storage device is a tube, the received signal may be stored on one line of the storage tube. On the transmission of the next pulse, the echoes are compared in accordance with their time of receipt with those already stored. If there is any change in the new echo over the stored echoes, a signal is derived; whereas signals which remain the same in their amplitude and time of reception with respect to the time of transmission are cancelled. This may be called line-by-line storage. The present invention is exemplified by the use of some of the techniques of such a line-by-line storage system. A second type of MTI system is also known in which the area to be scanned is placed in one to one relationship with the area of a storage tube. Echoes received from the entire area scanned are stored in their proper corresponding places on the storage tube target. On the second scan, the newly received echoes are compared with those stored. Internal cancellation characteristics of such a tube may be used to cancel signals which are the same on both scans and to derive an output signal corresponding to the moving targets. The present invention also uses some of the techniques of such a second MTI system. The former type of system is exemplified by the systems described at pages 632 et seq., section 16.3 of the above-mentioned Radar System Engineering; whereas the second type of system is exemplified by the system described in the copending application of Louis Pensak, filed March 30, 1950, Serial No. 152,947, entitled "Radar System and Tube" or the copending application of A. S. Jensen, filed May 12, 1950, Serial No. 161,661, entitled "Area Moving Target Indication." An abstract of the latter application, now abandoned, has been published (under the provisions of the Commissioner of Patents' notice of January 25, 1949, 619 O. G. 258) in the Official Gazette of November 20, 1951.

The present invention is directed both to a novel method and the apparatus for practising the method in operation of a pulsed radar MTI system. In accordance with the invention, a separate storage element is provided corresponding to each subsector of a larger sector to be scanned; the same plurality of pulses is transmitted from the antenna of the system during the scanning of each sub-sector; and these echo pulses are stored on the corresponding storage element in the order of the time intervals between transmission of the pulse giving rise to the echo and reception of the echo pulses. The storage element not only stores each signal received, but effectively differences them with respect to signals similarly previously stored on the same element over previous scannings of the same-sub-sector. The effect of the repetitive transmission in the same sub-sector and the storing is to average these signals. Then when a later received signal is compared with the previously stored signals, the output signal is substantially the difference between the received and previously averaged signal. The background clutter is substantially diminished. The background clutter due to antenna motion is especially substantially diminished.

In the embodiment of the invention described herein, a radar system has an antenna which is rotated at a speed correlated with the time of the transmitted pulses. A certain fixed number of pulses is transmitted for each sub-sector scanned and the echo pulses are stored in a radechon storage tube which scans the same line of a storage target repetitively the same number of times as a predetermined number of transmitted pulses allotted to each sub-sector. For example, one line of a storage tube target is assigned to each sub-sector of 3°. As the antenna scans the 3° sub-sector, there are transmitted ten pulses of energy. The line on the storage target is scanned ten times, once for each transmitted pulse, and the target echoes are stored on the line in the order of the time interval between transmission of the transmitted pulse giving rise to it and reception thereof; which order, of course, corresponds to range. On the next scan of this same 3° sector, the echoes arriving from ten transmitted pulses of energy are again stored on the same line with the previous signals. The differences between each received pulse and the average stored is taken off as the output signal. These differences are improved by use of a low-pass filter which filters out the high frequency components that are generated by the clutter cancellation process. The cancellation ratio of the system (the ratio of input signals to output signals for fixed targets) is thereby greatly improved. The clutter effects are reduced and particularly the clutter effects due to scanning motion of the antenna are reduced.

The foregoing and other objects, advantages, and novel features of the invention will be more apparent from the following description when taken in connection with the accompanying drawing in which:

Fig. 1 is a block diagram schematically illustrating one embodiment of the invention; and Fig. 2 is a circuit diagram schematically illustrating the circuits of one of the blocks of Fig. 1 with greater particularity.

Referring now more particularly to Fig. 1, an antenna 10 has a substantially horizontal directive electromagnetic energy pattern. The antenna is rotated by a motor 12 at a substantially uniform rate of ⅙ of a C. P. S. about a vertical axis. The motor 12 also controls the timing of certain trigger circuits 14. Trigger circuits 14 are connected by a connection 16 to a transmitter 18 and control the transmitter with 200 trigger pulses per second. These pulses may be several microseconds long but in any event are substantially less than the period between pulses. The transmitter 18 is pulse modulated by these trigger pulses from connection 16 and is connected to a TR (transmit-receive) arrangement 20 through a connection 22. The TR arrangement is connected by a connection 24 to antenna 10 and also by a connection 26 to a radar receiver 28. The TR arrangement 20 may be of a standard type which operates to pass energy from the transmitter 22 to the antenna 10 and switches received energy received at antenna 10 through connection 26 to the radar receiver 28. It will be understood that the connection 16 itself may carry the 200 pulses per second as indicated on Fig. 1 although alternatively there may be some submultiple frequency voltage supplied to transmitter 18 over the connection 16. Suitable trigger circuits controlled by the submultiple frequency voltage to modulate the transmitter may then be produced in the transmitter 18. The radar receiver 28 preferably includes the usual type of beat frequency detection circuits and preferably is not a saturated receiver but has a response which depends upon the strength of the received signal. Such response may be linear-logarithmic, if desired. The radar receiver 28 may include a video amplifier 30 in its final stages to amplify the detected echo pulses returned after transmission of energy from the antenna 10. The amplified echo pulses are supplied by connection 32 as the input signal of a suitable storage device exemplified by a radechon storage tube 34. This storage tube may be of the type disclosed in the RCA Review, volume IX, No. 1, for March 1948, in the article entitled "Barrier grid storage tube and its operation" by Jensen, Smith, Mesner, and Flory, at pages 112 and following. From trigger circuits 14 over a connection 35, trigger pulses of 200 C. P. S. are also supplied to a 200 microsecond delay multivibrator 36. In other words, the multivibrator 36 may be a circuit having one condition of stable equilibrium. Each triggered pulse upsets the condition of the circuit to a second condition of unstable equilibrium at which it remains for 200 microseconds and then returns to its first condition of stable equilibrium. The result is the generation of 200 microsecond-long pulses at a 200 C. P. S. rate which pulses are taken by connection 38 to the control grid of the radechon storage tube which is preferably normally biased beyond cutoff. The writing beam of the radechon storage tube is unblanked by the connection from the signal 38, or gated as it is sometimes called, for the 200 microsecond duration of these pulses from connection 38. The trigger circuits 14 by a connection 40 supply 20 C. P. S. triggers to a 10 microsecond delay multivibrator 42 which may be similar in its principle of operation to that of the 200 microsecond delay multivibrator 36, except that the delay period is shorter. The 20 C. P. S. ten microsecond-long pulses from the 10 microsecond delay multivibrator 42 are supplied by a connection 44 to a step voltage generator circuit 46 from which are derived the vertical deflection voltages for the storage tube 34. The step voltage generator 46 is supplied with a 2500 microsecond gating voltage over a connection 48 from a 2500 microsecond delay multivibrator 50 which in turn is triggered by triggers at ⅙ C. P. S. fed over connection 52 from the trigger circuits 14. The 2500 microsecond delay multivibrator again may be of the same type as the delay multivibrator 36 and 42 heretofore described except for its delay time. The output of the step voltage generator circuit 46 is a stepped voltage which descends from positive to negative values by equal voltage steps for 120 substantially equal steps spaced apart at ¹⁄₂₀ C. P. S. This output of the step voltage generator 46 is supplied over a connection 54 to a direct coupled phase inverter and centering circuit 56. The circuits 56 convert the stepped voltage 54 into a push-pull voltage which is supplied over connection 58 to the vertical deflection circuits of the radechon storage tube 34. Electron beam positioning means may also be included in the direct coupled phase inverter and centering circuits 56. The 200 microsecond delay multivibrator 36, also supplied an inverted 200 microsecond pulve over a connection 60 to a range sweep generator 62 which generates from this pulse a triangular sweep voltage pulse of 200 microseconds duration. This triangular sweep voltage pulse is applied by connection 64 to a horizontal phase inverter and centering circuit 66 to produce a push-pull output from the triangular sweep voltage. The push-pull output from the phase inverter and centering circuit 66 is supplied over a pair of connections 68 to the horizontal deflection circuits of the radechon storage tube 34. The output of the storage tube 34 is supplied by a connection 70 to a preamplifier 72. The connection 79 is for the purpose of supplying a signal the inverse polarity of that resulting from the pulse fed on connection 38, to compensate for any undesired signal output fed into the preamplifier 72 resulting from the pulse on connection 38. The output of preamplifier 72 is supplied by a connection 74 to a low-pass filter and cathode follower circuit 76. The output of the low-pass filter circuit is supplied to an amplifier and phase inverter 78 the output of which in turn is supplied to a full wave rectifier circuit 80 which circuit includes a cathode follower output. A detector 82 receives the output of the full wave rectifier circuits 80. The indicator 82 may comprise a cathode ray tube, the vertical and horizontal deflection voltages for which are supplied respectively through connection XX and YY from the vertical and horizontal deflection voltage connections 58 and 68 respectively for the radechon storage tube 34.

In operation, the antenna 10 rotates at a uniform rate of ⅙ C. P. S. or one revolution every 6 seconds. The axis of the beam from the antenna 10 scans over a 3° sector in ¹⁄₂₀ of a second. Let us assume some hypothetical direction, say north, at which the beam points when the trigger circuit generates the ⅙ C. P. S. trigger on the connection 52. As the axis of the beam rotates through the next 3°, and to be specific, say clockwise of north as viewed in plan, the transmitter transmits 10 equally spaced pulses of high frequency electromagnetic energy which are radiated from the antenna 10. The echoes from reflecting objects are received at antenna 10 and after detection in the radar receiver 28 and amplification in the video amplifier 30 are applied to the radechon storage tube 34. Meanwhile, the step voltage generator circuit at the end of the 3° scan is ready to take its first step. Also during the 3° scan, by virtue of the 200 C. P. S. trigger applied to the 200 microsecond delay multivibrator circuit 36, the range sweep generator has generated 10 sweep voltages each 200 microseconds in duration. Since the vertical sweep circuit of the radechon storage tube has not been actuated, the horizontal sweep may be assumed to sweep the beam from left to right along a single line on the radechon storage tube target. The length of the line swept and its time duration correspond to a radar range which corresponds substantially to 200 microseconds. Accordingly, targets more distant than this corresponding range are not picked up, although the system could obviously be modified to do so. On the next 3° sector scanned, the step voltage generator circuit takes one step, the transmitter transmits 10 more pulses equally spaced in time and the horizontal sweep sweeps over a horizontal line on the target which is stepped from the first line by at least the width of an electron beam of the storage tube at the point where it strikes the target. This process is continued for the 120 steps generated by the generator step voltage circuit, whereupon the ⅙ C. P. S. trigger voltage on connection 52 triggers the 2500 microsecond delay multivibrator 50. The 2500 microsecond pulse over connection 48 is used to reset the step voltage generator circuit to start triggering a new set of vertical deflection step voltages. When the antenna starts its second scan over the 360° sector to be scanned, and as each sub-sector of 3° is scanned, 10 pulses of energy equally spaced in time are radiated from the antenna 10. At the same time, the same line of the target of storage tube 34 is scanned by the storage tube electron beam 10 times successively at a uniform rate proportional to the range of the reflecting objects to be detected. The radechon storage tube is operated with such voltages to control the beam intensity that the storage tube target is not saturated with any single pulse. Accordingly, the storage tube target at any point increases or decreases in voltage in accordance with the successive signals impressed on it. As the first storage tube target line is scanned the first ten times, the target starts to build up the stored signals from echoing objects in the places on the line corresponding to the range of the reflecting objects in the 3° sector of the antenna 10. The second time the first line is scanned ten times, the stored signals continue to build up as the signal is impressed at these points. The output of the radechon storage tube on connection 70 on the second ten scannings of the first line for the signal corresponding to any one point on the first line or storage element, consists of the differences that result from the subtraction at each of the incoming ten pulse trains of the second set from the total stored signal. Each incoming pulse is thus stored only to a small degree, affecting the stored average only by a comparatively small amount. Under proper tube adjustment to get the desired effect, it should take on the order of 100 stored pulses, more or less, all equal before the target is in a state of equilibrium. In effect, then, each pulse contributes one percent to the stored average and 99 percent to the output signal. To detect these differences with certainty and distinguish over the high frequency clutter in each group of ten, the low-pass filter 76 is included. This low-pass filter excludes those high frequency signals which arise from clutter cancellation and permits the passage only of the true difference signals. The output from low-pass filter 76 may be supplied to the detector 82 which may have a correlated scan as shown with that of the radechon storage tube 34. In this scan of course the direction or horizontal deflection distance indicates range, and the vertical deflection indicates which 3° sector is being observed or illuminated by the antenna. Fixed objects of course will have substantially the same average echo after several scans as each incoming pulse. There will be substantially no signal on the indicator 82 corresponding to such objects. However, moving objects have difference signals resulting from each pulse, either because of their motion by moving into a second 3° sector as in the case of circumferential motion, or by changing range as in the case of radial motion with respect to the antenna 10. In general, the objects which are changing in range will produce both a positive and negative pulse, one corresponding to the place where the object is located on the first ten scans and the other corresponding to the place where the object is located on the second ten scans. These will be adjacent and are merged into a substantially single pulse by the full wave rectifier 80 to increase the sensitivity of the indicator 82 by being impressed for example on the intensity control of the cathode ray tube of the indicator. Moving targets may also be detected by their continually changing R. F. phase relation with respect to the clutter. This causes a doppler or beating between target and clutter. This beating effect causes the clutter to change rapidly during any group of ten pulse trains. These changes also may appear in the radechon output.

The operation of the system is now clear with the possible exception of the step voltage generator 46. The other components of the system are such as may be readily devised by those skilled in the art. Turning now to Fig. 2, there is illustrated with greater particularity a circuit which may serve for the step voltage generator circuit 46, although this is by no means the only such circuit which may be used for the purpose. A pentode type tube 100 receives on its suppressor grid 102 the pulses from the 10 microsecond delay multivibrator 42 through a capacitor 104. These pulses are of constant amplitude. The suppressor grid 102 receives a biasing voltage through a resistor 106 which is sufficient to keep the pentode tube 100 cut off except during the time of application of the 10 microsecond pulses over connection 44. Three hundred (300) volts negative is supplied from any suitable source as indicated to the cathode 108 of pentode 100. The control grid 110 of pentode 100 is connected at a variable voltage point between ground and the 300 volt negative supply. The screen grid 112 is grounded. A storage capacitor 114 is connected between the anode 116 to tube 100 and ground. The anode 116 is also connected through a resistor 118 and a normally opened relay actuated switch 120. The switch 120 is actuated by the relay 122, the windings of which are suitably connected to the 2500 microsecond delay multivibrator 50 through connection 48. The pentode acts as a current source which due to the constant amplitude circuit pulses applied to grid 102 allows substantially constant and equal pulses of current to flow as each pulse is impressed on the suppressor grid 102 substantially without variation due to changes in the anode voltage at the anode 114. As each current pulse is passed by the tube 100 it changes the storage capacitor 114 by a substantially equal amount of voltage, the storage capacitor 114 being sufficient in capacity for this purpose. Accordingly, the voltage across capacitor 114 is stepped with each 10 microsecond pulse in a negative direction. At the end of each ⅙ of a second, the pulse from the 2500 delay multivibrator actuates the relay 122 to close the switch 120. The capacitor 114 is thereby substantially short-circuited and the anode connected side of the storage capacitor 114 is raised to ground voltage. The resistor 118 is merely to prevent sparking. At the termination of the 2500 microsecond pulse at each ⅙ of a second the switch 120 opens again, and the voltage across capacitor 114 again begins to step in a negative direction. It will be observed that the voltage supplied for the tube is from the anode through ground through the 300 volt supply, the positive terminal of which is connected to ground and the negative terminal of which is connected to the cathode 108. The output of the step voltage generator is taken from suitable terminals and by a connection such as 54 as described hereinbefore.

Although the example herein illustrates a repetitive transmission of ten pulses for each sector, it is preferred to use only two or three pulses per sub-sector, not more. The reason for so restricting the number of pulses per sub-sector is because it can be shown theoretically that such restriction leads to a further improvement over the use of ten pulse transmissions per sub-sector. The use of more than three does not give as good results as may be derived by other techniques. Hence two or three pulses per sub-sector is an optimum.

Another important point is that the sub-sector need not be scanned by continuous antenna motion, but they may be step-scanned, as in the copending application of Richard W. Howery, entitled "Antenna Scanning" executed September 20, 1950, filed September 20, 1950, Serial No. 187,268. This requires only that the antenna structure and drive be modified to correspond to that disclosed in the said copending application, for example, in the apparatus described herein, to step at 3° steps every 1/20 of a second.

In view of the foregoing description, it will be apparent that the invention described includes a system in which a radar antenna repetitively scans sub-sectors of space, and a plurality of pulses are transmitted and the echoes stored and averaged for further comparison with pulses which are similarly stored and averaged on the next scanning of the same sub-sector. Thus, the antenna scanning rate, storage element scanning rate, and pulse transmission repetition rate are all suitably correlated to advantage. It will also be apparent that the method may be carried into effect with other apparatus. The apparatus indicated by the blocks in the drawing may take different forms well known to the art.

What I claim as my invention is:

1. A pulsed radar moving target indicator system comprising a transmitter to transmit electromagnetic energy pulses, a receiver to receive echo pulses from the transmitted pulses, a scanning antenna connected to said transmitter and to said receiver during their respective operative periods to scan sectors of space, means to time said transmitter with the scanning of said antenna to transmit a like plurality of pulses during the scan of any one of said sectors, means having independent storage elements one for each sector to store a portion of each of the echo pulses, said means being connected to said receiver to receive and store in time sequence after transmission of each pulse the received echo pulses, whereby the stored echo pulses from any target in one of said sectors are stored and effectively averaged during the scanning of said one sector, and means to compare the echo pulses with the previously stored average, whereby moving target echo pulses are distinguished from fixed target echo pulses.

2. The system claimed in claim 1, said means to compare echo pulses comprising a low-pass filter.

3. The system claimed in claim 1, further comprising an indicator connected to indicate the results of the comparison of said comparison means.

4. The system claimed in claim 1, said storage means comprising a storage tube.

5. The system claimed in claim 4, said storage tube having means to produce an electron beam, a storage target to receive the electron beam, and means to deflect said electron beam, the independent storage elements being lines on said target, one line allotted to each scan sector, means applying a voltage to said deflection means to cause said lines to be separated by at least the width of the electron beam at the point the beam strikes the target.

6. The system claimed in claim 5, said lines being straight lines.

7. The system claimed in claim 1 further comprising means including a motor to rotate said antenna to cause the scanning thereof, said means to time said transmitter being responsive to and under control of a mechanical connection to said motor means.

References Cited in the file of this patent

UNITED STATES PATENTS

| | | |
|---|---|---|
| 2,422,135 | Sanders | June 10, 1947 |
| 2,430,038 | Wertz | Nov. 4, 1947 |
| 2,451,005 | Weimer et al. | Oct. 12, 1948 |
| 2,454,410 | Snyder | Nov. 23, 1948 |
| 2,470,939 | Miller et al. | May 24, 1949 |
| 2,471,516 | Bryant | May 31, 1949 |
| 2,513,962 | Patterson | July 4, 1950 |

FOREIGN PATENTS

| | | |
|---|---|---|
| 604,671 | Great Britain | July 8, 1948 |